June 16, 1942.    M. KLOSE    2,286,552
MOTOR DRIVEN GRASS SHEARS
Filed April 26, 1941
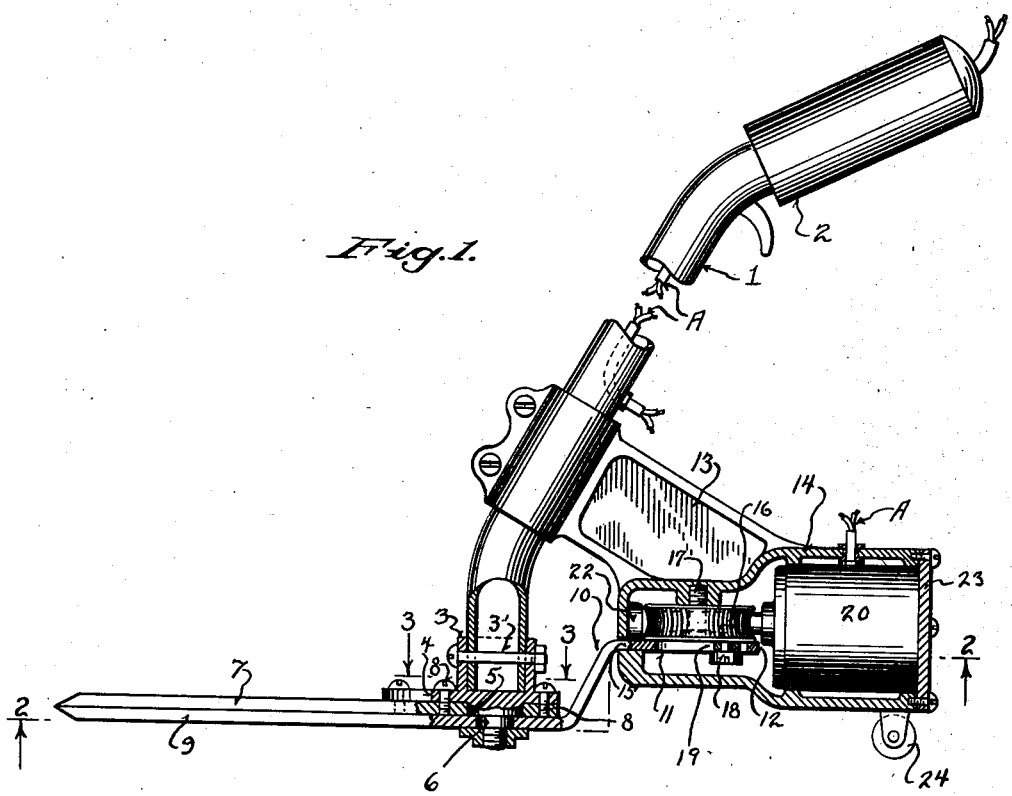
Fig.1.
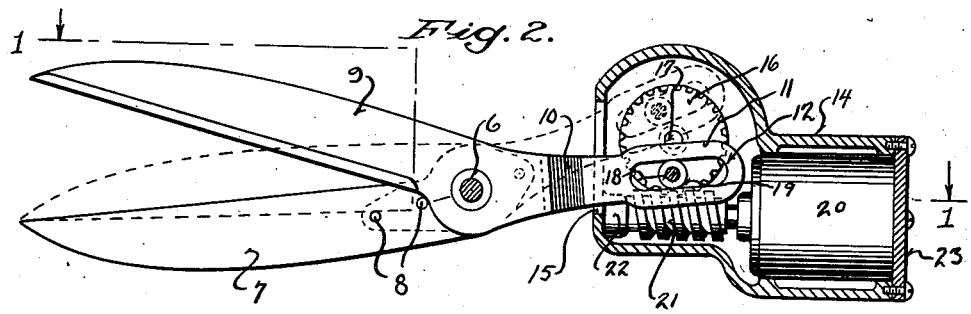
Fig.2.
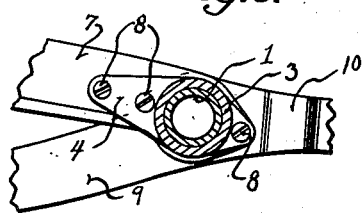
Fig.3.
INVENTOR
MILTON KLOSE
BY
ATTORNEYS Patented June 16, 1942

2,286,552

UNITED STATES PATENT OFFICE 2,286,552

MOTOR DRIVEN GRASS SHEARS

Milton Klose, Manitowoc, Wis.

Application April 26, 1941, Serial No. 390,568

1 Claim. (Cl. 30—228)

My invention refers to motor driven grass shears and particularly to that type known as edge trimmers.

The object of my invention is to provide a simple, economical and effective edge trimmer embodying a pair of oscillatory shear blades under motor control, the same being housed and associated with the shears slightly above the ground line.

Another object of my invention is to provide one of the shears with a slotted extension adapted to engage a crank wheel under motor control.

With the above and other objects in view, the invention consists in certain peculiarities of construction and arrangement of parts, as will be hereinafter fully set forth in connection with the acompanying drawing and subsequently claimed.

In the drawing:

Figure 1 is a part sectional elevation of a grass shears embodying the features of my invention the section being indicated by line 1—1 of Figure 2.

Figure 2 is an inverted plan view partly in section as indicated by the line 2—2 of Figure 1; and, Figure 3 is a fragmentary detail of the upper face view of the shears in section as indicated by the line 3—3 of Figure 1.

Referring by characters to the drawing, 1 represents a hollow handle carrying any type of trigger controlled electric switch 2. The lower portion of the handle, which is curved downwardly, has a ferrule 3 secured thereto by a bolt 3', or any other suitable means.

The ferrule is provided with a bottom flange 4 and a centrally positioned depending boss 5, having a shouldered trunnion 6. Secured to the ferrule flange 4 by screws, is a fixed shear blade 7, which is apertured at its shank to fit over the boss 5, and secured thereto by screws 8, whereby said blade can be readily assembled or removed for sharpening.

On oscillatory cutter blade 9 is provided, having its shank portion formed with a circular aperture for mounting on the trunnion 6, and said shank portion is also formed with an upwardly inclined offset arm 10 having a terminal end 11 in parallel relation to the blade portion. The end 11 of the arm is also provided with a longitudinally disposed slot 12.

A neck 13, forming part of a housing 14, terminates with a clip, the same being secured to the handle 1, slightly above the shears, the housing 14 is sealed to eliminate dust, etc., therefrom, with the exception that it is provided at its forward end with a slotted mouth 15 to which the end 11 of the arm 10 extends of the oscillatory blade.

It will be apparent that the single flange ferrule which constitutes a mounting for both blades and also has an attaching means to the handle, is simple in construction and requires machining only at the shouldered pivot of the movable blade whereby cheapness of construction will result and furthermore, this boss shoulder also facilitates assemblage of the two blades and alinement with reference to their axis.

Furthermore, the neck which extends from the housing and its clip connection to the handle, is also economical and readily adaptable to assemblage.

Mounted in the housing above the arm is a gear wheel 16, the same being in the form of a worm gear, which is rotated upon a stud 17 carried by the housing. The wheel also has extending from its lower surface a crank pin 18 which carries an anti-friction roller 19 that engages in the slot 12 of the arm end 11.

Mounted in the housing 14 is an electric motor 20 of any standard type, and secured to the shaft of said motor is a worm 21 which drives the worm gear 16. The end of the motor shaft is journaled in a boss 22, provided in the housing to insure stability of the drive when the motor is run at high speed. The motor can also be readily removed by merely disconnecting the rear housing cap 23.

It will also be understood that the motor is supplied with electric current through a suitable cable A, which extends through the switch 2 and from said switch through the hollow handle to the motor 20. As shown in Figure 1, the housing may carry a supporting roller 24.

While I have shown a fixed blade and an oscillatory blade in connection with the illustration of my invention, together with a worm drive, obviously such details may be varied as for example, in some instances both blades may be oscillated, but for simplicity and cheapness of construction, I prefer a fixed blade and motor drive oscillatory blade.

While I have shown and described the invention minutely as to details, it is understood that such details may be varied within the scope of the claim.

I claim:

A grass trimming shears comprising a handle, a flanged ferrule secured to its lower end, a boss depending from the flange terminating with a shouldered trunnion, a fixed shear blade having an aperture fitted to the ferrule boss above the shouldered trunnion, bolts for securing the blade to the ferrule flange whereby said blade is held against twisting upon the boss, an oscillatory cutting blade mounted upon the shouldered trunnion extending from the ferrule boss, a motor housing having a neck extending therefrom terminating with a clip engaging the handle and secured thereto, and a motor mounted in the housing in driving gear connection with the oscillatory cutter blade.

MILTON KLOSE.